(No Model.)
T. A. EDISON.
SYSTEM OF DISTRIBUTING ELECTRICITY.
No. 464,822. Patented Dec. 8, 1891.
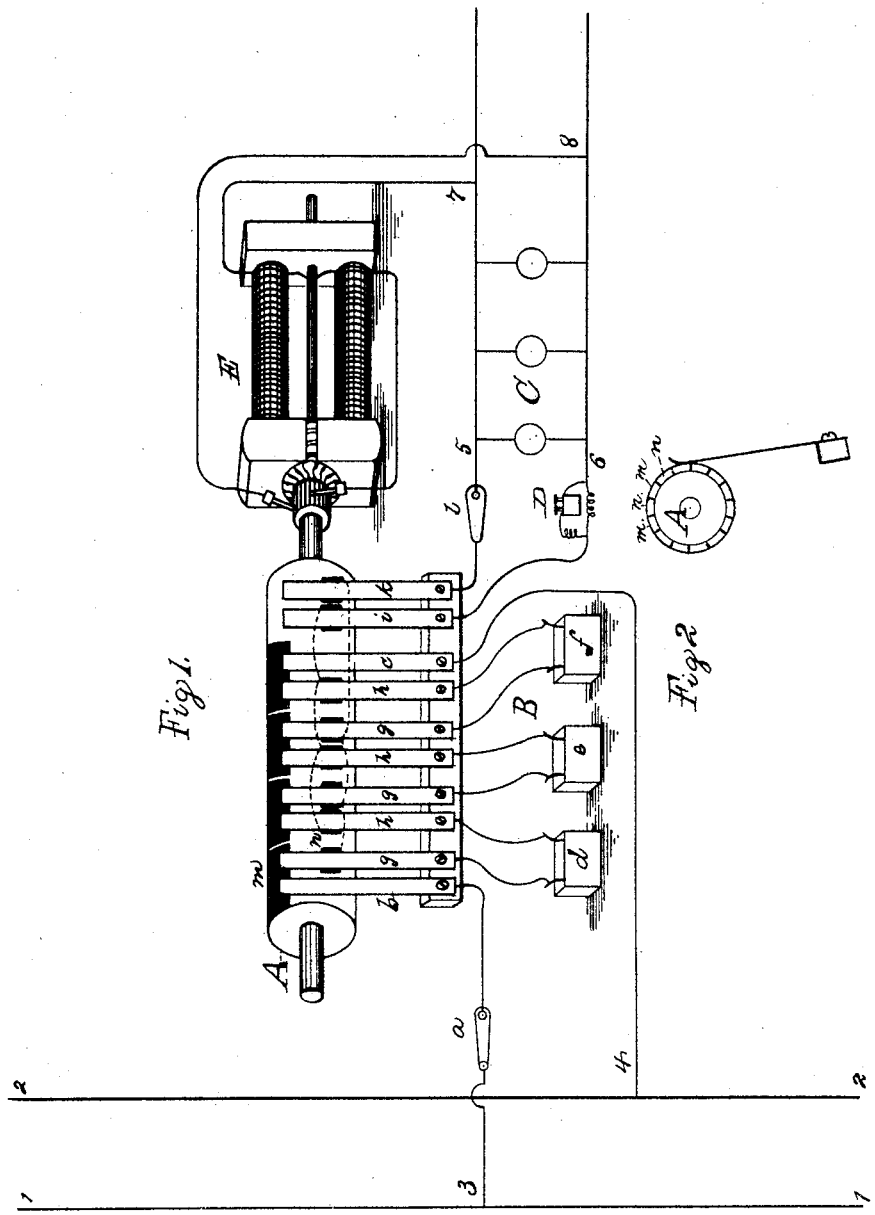
WITNESSES:
INVENTOR:

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF DISTRIBUTING ELECTRICITY.

SPECIFICATION forming part of Letters Patent No. 464,822, dated December 8, 1891.

Application filed June 26, 1882. Serial No. 65,235. (No model.) Patented in England July 14, 1882, No. 3,355; in France November 21, 1882, No. 150,833; in Belgium December 15, 1882, No. 59,751, and in Italy January 13, 1883, No. 14,950.

*To all whom it may concern:*

Be it known that I, THOMAS A. EDISON, of Menlo Park, in the county of Middlesex and State of New Jersey, have invented a new and useful Improvement in Systems of Electric Lighting, (for which I have obtained patents in the following foreign countries: Great Britain, No. 3,355, dated July 14, 1882; France, No. 150,833, dated November 21, 1882; Italy, No. 14,950, dated January 13, 1883, and Belgium, No. 59,751, dated December 15, 1882;) and I do hereby declare that the following is a full and exact description of the same, reference being had to the accompanying drawings, and to the letters and figures of reference marked thereon.

The object I have in view is to utilize high-tension currents on the main conductors of a system of electric lighting having incandescent electric lamps, motors, or other translating devices arranged in multiple-arc circuits and requiring a current of lower tension, the transition from a current of high tension to one of lower tension being made with very little loss of power and the normal candle-power of the lamps being maintained constantly. By the use of currents of high tension in the main conductors a great saving can be made in the metal required for such main conductors. The object is accomplished by the employment of a system of distribution having, essentially, the following elements, viz: a main supplying-circuit extending from the source of supply to a point or points more or less distant, tension-reducers located at a distance from the point of supply and connected each with the main or supplying circuit by a cross or multiple-arc connection, so as to be independent of one another, and translation-circuits containing electric lamps or other translating devices arranged in cross or multiple circuits therein, such translation-circuits being connected with the tension-reducers and being supplied with currents of lower tension than the current upon the main or supplying circuit. The tension-reducers employed each reduce the tension *per se*—i. e., the difference in potential between the terminals of the translation or lamp circuit is less than the difference in potential between the terminals of the apparatus where connected with the main circuit, and each tension-reducer also acts constantly to receive a current from the high-tension circuit and deliver a current of lower tension to the translation-circuit, producing in said translation-circuit a current having at every moment a definite relation to the difference in potential between the terminals of the apparatus at the high-tension circuit.

In carrying out my invention I may employ for my tension-reducer a secondary battery or batteries or a condenser or condensers located between the main and translation circuits and thrown by a commutator rapidly into connection with the main circuit and then into connection with the translation-circuit. This commutator also changes the relation of the elements of the battery or batteries or condenser or condensers from series when in connection with the main circuit to multiple arc, or multiple series when in connection with the translation-circuit, or from an arrangement in multiple series to an arrangement in multiple arc, or to another arrangement in multiple series with a smaller number of elements in series, so that battery or condenser may be charged with a high-tension current, and in discharging will produce a current of lower tension. An electric motor operated by the current is preferably used to work the commutator, although any other form of motor may be used. A meter is provided to measure the consumption of energy, and proper circuit-controllers are employed to make and break the several circuits, as desired.

The foregoing will be better understood from the drawings, in which—

Figure 1 is a view, partly in diagram, of apparatus embodying the invention, and Fig. 2 an end view of the commutator-cylinder.

1 2 are the conductors of the main circuit, extending to a distance from the point of supply and provided with a current of high tension from one or more dynamo or magneto electric machines located at the point of supply.

The system of distribution is a multiple-arc system, the conductors throughout being connected in multiple arc. From the main conductors 1 2 is taken a multiple-arc circuit 3 4, provided with a circuit-controller $a$. The conductors of this circuit extend to terminal springs $b$ $c$, resting upon the commutator-cylinder A.

B is a secondary battery or a condenser, one composed of three elements $d$ $e$ $f$ being shown. These elements are connected with the terminal springs $g$ $h$, resting on the cylinder A between the terminals $b$ $c$ of the charging-circuit 3 4.

The lamp or translation circuit 5 6 is connected with the terminal springs $i$ $k$, resting on the cylinder A. This translation-circuit has electric lamps C arranged in multiple-arc or cross circuits therein.

A circuit-controller $l$ is provided to make and break the translation-circuit 5 6, while each lamp may also have its individual circuit-controller.

D is a meter located in the line of the translation-circuit 5 6 for measuring the current consumed. It is preferable to use one of my electrolytic meters.

E is an electric motor located in a multiple-arc circuit 7 8 from the translation-circuit 5 6. The shaft of its armature forms a continuation of that of the commutator-cylinder, or it may be connected by gearing or belting with such commutator-shaft. The commutator-cylinder has two sets of plates $m$ $n$. The plates $m$ are so constructed that when the springs rest upon them the translation-circuit will be broken and the elements of the secondary battery or condenser will be in series in the charging-circuit 3 4. The plates $n$ are of different construction and are so connected that when the commutator-springs rest upon them the charging-circuit 3 4 will be broken and the elements of the secondary battery or condenser will be connected in multiple arc with the translation-circuit 5 6 and will discharge through the electric lamps or other translating devices located in said circuit. It will be seen by reference to the drawings that to accomplish this result the plates $m$ are made wide enough to connect together two of the spring-fingers. In this way the terminal spring $b$ of the charging-circuit is connected with the polar spring $g$ of the element $d$. The polar spring $h$ of the element $d$ is connected by the next plate of the line of plates $m$ with the spring $g$ of the element $e$. The spring $h$ of the element $e$ is connected with the spring $g$ of the element $f$ by the next plate $m$, and the spring $h$ of the element $f$ is connected by another plate $m$ with the other terminal $c$ of the charging-circuit. There is no plate $m$ beneath the terminals $i$ $k$ of the lamp-circuit. The plates $n$ of each line are single plates, each being in contact with but one spring. There are no plates $n$ beneath the terminals $b$ $c$ of the charging-circuit. There is, however, a plate $n$ beneath each polar spring of the elements $d$ $e$ $f$ and also beneath each of the two terminals $i$ $k$ of the translation-circuit. The plates $n$ of each line that come beneath all the polar springs $g$ are connected together and with the terminal $k$ of the translation-circuit, while the plates $n$ of each line that come beneath the polar springs $h$ are connected together and with the terminal $i$ of the translation-circuit. A number of lines of the plates $m$ $n$ are placed upon the commutator-cylinder, as shown in Fig. 2. The initial impulse may be given to the motor in starting by hand, or the motor-circuit 7 8 may be taken from the charging-circuit 3 4, in which case the current in the motor-circuit will be continuous.

The lamp-circuit is broken by the commutator; but the movement is so rapid that the lamps will give a steady light without flicker. The secondary battery or condenser in this location and in connection with the rapidly-moving commutator acts simply as a tension-reducer, reducing the tension *per se*, and serving to produce economically in the translation-circuit a current of lower tension than that of the current of the main circuit. With a secondary battery the rapid commutation prevents deposit on the plates, and the conversion is performed by the action of the nascent gases. The secondary battery therefore is not operated in the usual way, nor does it have its ordinary function. With a condenser the action is by induction between the opposing plates or condensing-surfaces. With the apparatus shown, the battery or condenser having three elements, if lamps or other translating devices require a pressure of one hundred volts, three hundred volts may be used in the main circuit, the shifting of the connection of the elements from series to multiple arc producing the reduction from three hundred volts in the charging-circuit to one hundred volts in the translation-circuit.

It will be observed that the secondary battery or condenser is in purpose and operation a constantly-acting tension-reducer *per se*—that is to say, the difference in potential between the terminals of the translation or lamp circuit is less than the difference in potential between the terminals of the apparatus where connected with the main circuit, and these differences in potential bear at every moment a definite relation to each other. It is in this sense that the term "tension-reducer" is used herein.

What I claim as my invention is—

1. In a system of electrical distribution, the combination of a main circuit extending to a distance from the source of electrical energy and having a current of high tension, a constantly-acting tension-reducer connected with such main circuit by a multiple-arc or cross circuit, so as to be independent of other similarly-connected tension-reducers, and a translation-circuit supplied by such tension-reducer with a current of lower tension, substantially as set forth.

2. In a system of electrical distribution, the combination of a main circuit extending to a distance from the source of electrical energy and having a current of high tension, a translation-circuit, translating devices arranged in multiple arc in such translation-circuit, and a constantly-acting tension-reducer connected with such main circuit by a multiple-arc or cross circuit and also connected with said translation-circuit, said tension-reducer being charged from such main circuit and discharging a current of lower tension in said translation-circuit, substantially as set forth.

3. In a system of electrical distribution, the combination of a main circuit extending to a distance from the source of electrical energy and having a current of high tension, and a translation-circuit with an intermediate secondary battery or condenser, and a continuously-working commutator throwing all the elements of such secondary battery or condenser together and at the same time rapidly form a series connection with the main circuit to a multiple-arc connection with the translation-circuit and back again, substantially as set forth.

4. In a system of electrical distribution, the combination of a main circuit extending to a distance from the source of electrical energy and having a current of high tension, and a translation-circuit with an intermediate secondary battery or condenser, a commutator throwing all the elements of such secondary battery or condenser together and at the same time rapidly form a series connection with the main circuit to a multiple-arc connection with the translation-circuit, and an electric motor working such commutator, substantially as set forth.

This specification signed and witnessed this 19th day of June, 1882.

THOMAS A. EDISON.

Witnesses:
  RICHD. N. DYER,
  EDWARD H. PYATT.